(12) United States Patent
Burdeniuc et al.

(10) Patent No.: US 8,580,864 B2
(45) Date of Patent: *Nov. 12, 2013

(54) TRIMER CATALYSTS WITH IMPROVED PROCESSABILITY AND SURFACE CURE

(75) Inventors: Juan Jesus Burdeniuc, Colmar, PA (US); Torsten Panitzsch, Henstedt-Ulzburg (DE); John Elton Dewhurst, Macungie, PA (US)

(73) Assignee: Air Products and Chemicals, Inc., Allentown, PA (US)

( * ) Notice: Subject to any disclaimer, the term of this patent is extended or adjusted under 35 U.S.C. 154(b) by 1037 days.

This patent is subject to a terminal disclaimer.

(21) Appl. No.: 11/418,037

(22) Filed: May 4, 2006

(65) Prior Publication Data

US 2007/0259982 A1    Nov. 8, 2007

(51) Int. Cl.
*C08G 18/22* (2006.01)

(52) U.S. Cl.
USPC .......... 521/124; 521/125; 521/128; 521/129; 521/130; 521/170

(58) Field of Classification Search
USPC .................. 521/124, 125, 130, 170, 128, 129
See application file for complete search history.

(56) References Cited

U.S. PATENT DOCUMENTS

| | | |
|---|---|---|
| 3,360,544 A | 12/1967 | Wygant et al. |
| 3,892,687 A | 7/1975 | Bechara et al. |
| 3,940,517 A | 2/1976 | DeLeon |
| 3,954,684 A | 5/1976 | Farrissey, Jr. et al. |
| 3,988,267 A | 10/1976 | Bechara et al. |
| 3,989,651 A | 11/1976 | Lockwood et al. |
| 3,993,652 A | 11/1976 | Bechara et al. |
| 4,003,859 A * | 1/1977 | Reymore et al. ............. 521/114 |
| 4,026,840 A | 5/1977 | Bechara et al. |
| 4,148,980 A | 4/1979 | Narayan |
| 4,454,317 A | 6/1984 | Disteldorf et al. |
| 4,503,226 A | 3/1985 | Tang et al. |
| 4,686,240 A * | 8/1987 | Bailey et al. ................. 521/103 |
| 4,771,025 A | 9/1988 | Eling et al. |
| 5,278,195 A * | 1/1994 | Volkert et al. ................. 521/98 |
| 5,321,050 A | 6/1994 | Morimoto et al. |
| 5,350,781 A | 9/1994 | Liman et al. |
| 5,621,051 A | 4/1997 | Okutani et al. |
| 5,773,483 A | 6/1998 | Eling et al. |
| 6,060,531 A * | 5/2000 | Horn et al. ................. 521/167 |
| 2002/0122929 A1* | 9/2002 | Simpson et al. ........... 428/316.6 |
| 2005/0027026 A1 | 2/2005 | Kinoshita |

FOREIGN PATENT DOCUMENTS

| | | |
|---|---|---|
| EP | 0 381 324 A1 | 8/1990 |
| GB | 697452 A | 9/1953 |
| GB | 1073079 A | 6/1967 |
| WO | 95/02619 A | 1/1995 |

* cited by examiner

*Primary Examiner* — John Cooney
(74) *Attorney, Agent, or Firm* — Michael K. Boyer

(57) ABSTRACT

The present invention provides trimerization catalyst compositions having an α,β-unsaturated carboxylate salt and methods to produce a polyisocyanurate/polyurethane foam using such trimerization catalyst compositions.

26 Claims, 4 Drawing Sheets

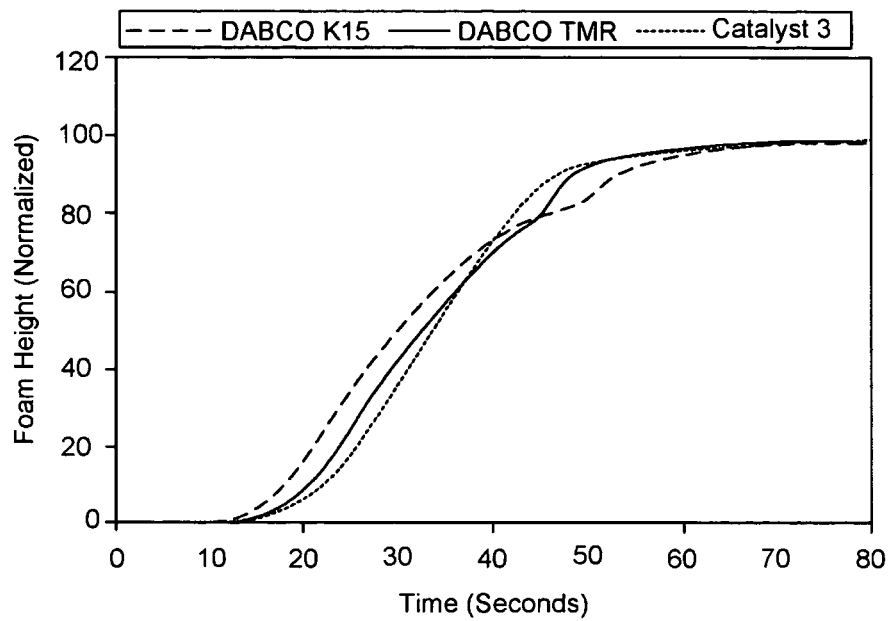

TRIMER CATALYSTS WITH IMPROVED PROCESSABILITY AND SURFACE CURE

BACKGROUND OF THE INVENTION

The present invention relates generally to catalyst systems, compositions comprising catalyst systems, polyisocyanurate/polyurethane (PIR/PUR) foam formulations, and methods of making PIR/PUR foams.

Typically, polyisocyanurate/polyurethane (PIR/PUR) foams are made by reacting a polyol and a polyisocyanate in the presence of a catalyst. Additional additives can be present. PIR/PUR foam products have excellent thermal stability and flame resistance. Isocyanurates retain their strength to temperatures of about 160° C. and are resistant to most organic solvents, acids, alkali, ultraviolet light, and humidity.

Certain carboxylate salts, such as, for example, certain alkali metal carboxylate salts, have been used as catalysts in the production of PIR/PUR foams. The use of commercially available alkali metal carboxylate salt catalysts, however, often leads to undesirable foam processing problems which are particularly significant in continuous foam operations. A distinctive "step" is observed, which is normally associated with the onset of the trimerization process, when measuring the rise speed profile of the foam, or by plotting the foam height versus time. This trimerization "step" causes a significant change in the speed of the foam rise; in essence, the foam expands at two different rates during the foaming process. In a continuous polyisocyanurate/polyurethane foam lamination operation, it is difficult to adjust the speed of the production unit to match the change in the speed of the foam rise. The result can be foam overpacking or foam back flow. This undesirable rapid rise in foam height is particularly troublesome when processing polyisocyanurate/polyurethane formulations at a high Isocyanate Index. That is, the change in the rate of foam rise is much more dramatic at a higher Isocyanate Index. Consequently, it is a technical challenge to produce desirable low flammability foam products, with a high isocyanate index, when using conventional alkali metal carboxylate salt catalysts.

As compared to alkali metal carboxylate salt catalysts, commercially available polyisocyanurate trimerization catalysts based on hydroxyalkylammonium carboxylate salts show different processability in continuous operations. They provide a smoother rate of rise profile and have a less significant trimerization "step." That is, the rate of foam rise is more consistent, even at a higher Isocyanate Index. However, hydroxyalkylammonium carboxylate salt catalysts can be unstable at temperatures above about 100° C., decomposing into volatile amine by-products. This decomposition process causes the release of volatile amines and can impart an undesirable amine odor to finished foam products. The polymerization reactions that produce PIR/PUR foam are highly exothermic, often leading to foam processing temperatures in excess of 100° C. Hence, hydroxyalkylammonium carboxylate salt catalysts can provide more predictable foam processability, but sometimes at the expense of a foam product with an undesirable amine odor.

Thus, there exists a need for a catalyst composition that can offer a smooth rise profile—foam height versus time—for producing PIR/PUR foams in continuous operations. Further, the catalyst composition also should perform well in foam formulations with a high Isocyanate Index. At the same time, the catalyst composition should provide equivalent or faster surface cure when compared to commercially available catalyst systems, such that the foam products made with the catalyst composition can have reduced surface friability and enhanced surface adherence during the manufacture of finished products such as laminated foam panels. Optionally, depending upon the selection of the catalyst components, the catalyst composition can be thermally stable at the temperatures which PIR/PUR foams normally encounter during manufacturing, and produce foams that are substantially free of volatile amines and/or amine odors.

BRIEF SUMMARY OF THE INVENTION

The present invention provides a novel catalyst composition for producing a PIR/PUR foam comprising at least one $\alpha,\beta$-unsaturated carboxylate salt having the formula

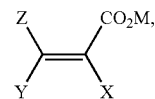

wherein:
X, Y, and Z are selected independently from a $C_1$-$C_{36}$ alkyl, alkenyl, aryl, or aralkyl, any of which are substituted or unsubstituted; —$CO_2H$; —$CO_2M$; or a hydrogen atom; and
M in each occurrence is selected independently from
(i) an alkali metal ion,
(ii) an alkaline earth metal ion, or
(iii) a quaternary ammonium ion.

In another aspect, the present invention discloses a novel composition comprising the contact product of at least one active hydrogen-containing compound and a catalyst composition comprising at least one $\alpha,\beta$-unsaturated carboxylate salt. Further, the present invention also discloses a novel composition comprising the contact product of at least one polyisocyanate and a catalyst composition comprising at least one $\alpha,\beta$-unsaturated carboxylate salt.

The present invention also provides a method for preparing a polyisocyanurate/polyurethane (PIR/PUR) foam which comprises contacting at least one polyisocyanate with at least one active hydrogen-containing compound, in the presence of at least one blowing agent and an effective amount of a catalyst composition comprising at least one $\alpha,\beta$-unsaturated carboxylate salt.

The catalyst composition of the present invention offers a substantially consistent foam height rise versus time—even at a high Isocyanate Index—and provides a faster surface cure during the preparation of PIR/PUR foams. In another aspect of the present invention, the catalyst composition can be thermally stable at standard foam processing temperatures, producing PIR/PUR foams which are substantially free of volatile amines and/or amine odors.

DEFINITIONS

The following definitions are provided in order to aid those skilled in the art in understanding the detailed description of the present invention.
PIR—Polyisocyanurate.
PUR—Polyurethane.
Isocyanate Index—The actual amount of polyisocyanate used divided by the theoretically required stoichiometric amount of polyisocyanate required to react with all the active hydrogen in the reaction mixture, multiplied by 100. Also known as (Eq NCO/Eq of active hydrogen)× 100.
pphp—parts by weight per hundred weight parts polyol.

DABCO® K15 catalyst from Air Products and Chemicals, Inc. (APCI) is a 70% solution of an alkali metal carboxylate salt, potassium 2-ethylhexanoate (also known potassium octoate), in diethylene glycol.

DABCO TMR® catalyst from APCI is a 75% solution of 2-hydroxypropyltrimethylammonium octoate in ethylene glycol Polycat® 5 catalyst from APCI is urethane catalyst, known chemically as pentamethyldiethylenetriamine.

BRIEF DESCRIPTION OF SEVERAL VIEWS OF THE DRAWINGS

FIG. 4 presents a plot of the normalized foam height versus time for α,β-unsaturated carboxylate salt catalyst 3, the DABCO® K15 catalyst, and the DABCO TMR® catalyst, at an Isocyanate Index of about 270.

DETAILED DESCRIPTION OF THE INVENTION

Figure 1:
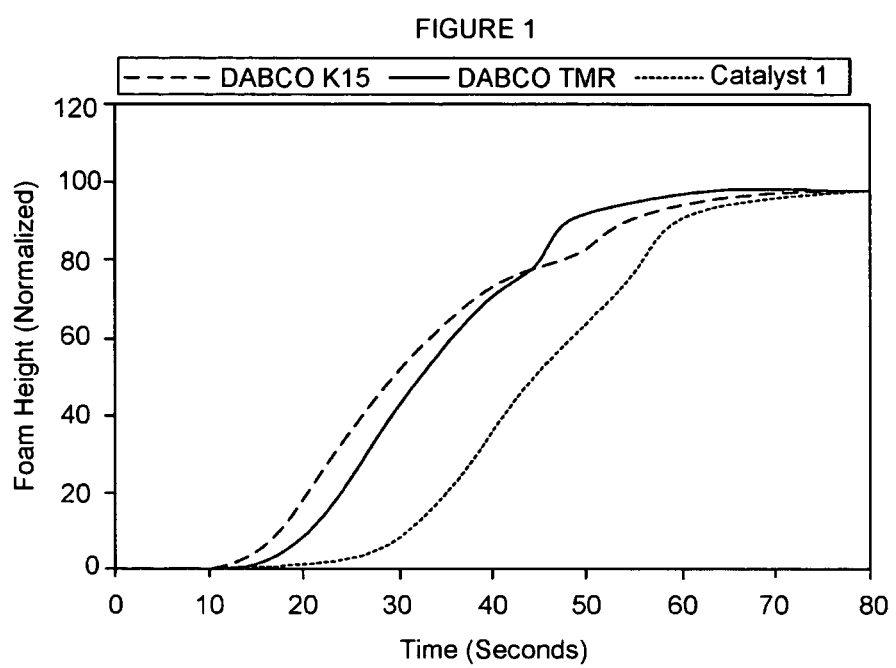
FIG. 1 presents a plot of the normalized foam height versus time for α,β-unsaturated carboxylate salt catalyst 1, the DABCO® K15 catalyst, and the DABCO TMR® catalyst, at an Isocyanate Index of about 270.

The present invention is directed to a novel catalyst composition comprising at least one α,β-unsaturated carboxylate salt. This novel catalyst system can be used as a polyisocyanate trimerization catalyst system for producing polyisocyanurate/polyurethane (PIR/PUR) foams. Further, the present invention also is directed to novel compositions comprising the contact product of at least one active hydrogen-containing compound and a catalyst composition comprising at least one α,β-unsaturated carboxylate salt, as well as novel compositions comprising the contact product of at least one polyisocyanate and a catalyst composition comprising at least one α,β-unsaturated carboxylate salt. These novel compositions can be used together with additional components to produce PIR/PUR foams.

Also, the present invention provides a method for preparing a PIR/PUR foam which comprises contacting at least one polyisocyanate with at least one active hydrogen-containing compound in the presence of at least one blowing agent and an effective amount of a catalyst composition comprising at least one α,β-unsaturated carboxylate salt. Additionally, rigid PIR/PUR foams can be produced with the novel catalyst system of the present invention by several methods known within the art.

A catalyst composition comprising at least one α,β-unsaturated carboxylate salt can be used to trimerize isocyanates to produce isocyanurates. Generally, any amount of the at least one α,β-unsaturated carboxylate salt can be used in the compositions of the present invention. As used in practice, catalyst systems for PIR/PUR foams typically include solutions of carboxylate salts in, for example, a diluent such as ethylene glycol. When a quantity by weight, or by mole, of the catalyst composition of the present invention is discussed, the quantity will exclude the effect of the diluent, unless stated otherwise. As an example, if 10 grams of a 50% solution of potassium acetate catalyst in ethylene glycol were used in a given application, the amount of the potassium acetate salt catalyst would equal 5 grams. Hence, 5 grams of that catalyst component would be used in calculating any weight ratios of that component in relation to, for example, the amount of active hydrogen-containing compound or the amount of polyol.

Applicants disclose several types of ranges in the present invention. These include, but are not limited to, a range of temperatures; a range of number of atoms; a range of foam density; a range of Isocyanate Index; and a range of pphp for the blowing agent, water, surfactant, flame retardant, urethane catalyst, and catalyst composition comprising at least one α,β-unsaturated carboxylate salt. When Applicants disclose or claim a range of any type, Applicants' intent is to disclose or claim individually each possible number that such a range could reasonably encompass, as well as any subranges and combinations of sub-ranges encompassed therein. For example, when the Applicants disclose or claim a chemical moiety having a certain number of carbon atoms, Applicants' intent is to disclose or claim individually every possible number that such a range could encompass, consistent with the disclosure herein. For example, the disclosure that "X" can be an alkyl group having up to 36 carbon atoms, or in alternative language a $C_1$ to $C_{36}$ alkyl group, as used herein, refers to a "X" group that can be selected independently from a alkyl group having 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, or 36 carbon atoms, as well as any range between these two numbers (for example, a $C_1$ to $C_{1-8}$ alkyl group), and also including any combination of ranges between these two numbers (for example, a $C_3$ to $C_5$ and $C_7$ to $C_{10}$ alkyl group). Likewise, this applies to all other carbon ranges disclosed herein, for example, $C_1$ to $C_{36}$ ranges for Y and Z; alkoxy groups having up to 10 carbon atoms; etc.

Similarly, another representative example follows for the parts by weight of the catalyst composition comprising at least one α,β-unsaturated carboxylate salt per hundred weight parts of the at least one active hydrogen-containing compound in a foam formulation. If the at least one active hydrogen-containing compound is an at least one polyol, the parts by weight per hundred weight parts polyol is referred to as pphp. Hence, by the disclosure that the catalyst composition comprising at least one α,β-unsaturated carboxylate salt is present in an amount from about 0.05 to about 10 pphp, for example, Applicants intend to recite that the pphp can be selected from about 0.05, about 0.06, about 0.07, about 0.08, about 0.09, about 0.1, about 0.2, about 0.3, about 0.4, about 0.5, about 0.6, about 0.7, about 0.8, about 0.9, about 1, about 2, about 3, about 4, about 5, about 6, about 7, about 8, about 9, or about 10. Likewise, all other ranges disclosed herein should be interpreted in a manner similar to these two examples.

Applicants reserve the right to proviso out or exclude any individual members of any such group, including any sub-ranges or combinations of sub-ranges within the group, that may be claimed according to a range or in any similar manner, if for any reason Applicants choose to claim less than the full measure of the disclosure, for example, to account for a reference that Applicants may be unaware of at the time of the filing of the application. Further, Applicants reserve the right to proviso out or exclude any individual substituents, analogs, compounds, ligands, structures, or groups thereof, or any members of a claimed group, if for any reason Applicants choose to claim less than the full measure of the disclosure, for example, to account for a reference that Applicants may be unaware of at the time of the filing of the application.

Another aspect of the present invention provides a thermally stable catalyst system. When used to describe this feature, a compound is defined as thermally stable at a given temperature when it does not decompose or release volatile amines and/or related amine odors at the given temperature. A hydroxyalkylammonium salt catalyst, such as the DABCO TMR® catalyst, can become unstable when the PIR/PUR foam temperature reaches above about 100° C. during foam processing. At these elevated temperatures, due to the nature of the quaternary amine salt, the DABCO TMR® catalyst can release volatile amine components. Catalyst compositions of the present invention which are based on quaternary ammonium salts are thermally stable if they do not have either functional groups (e.g., hydroxyl) or hydrogen on the carbon atom at the B-position relative to the quaternary nitrogen.

Thus, thermally stable catalyst compositions of the present invention include, but are not limited to, alkali metal $\alpha,\beta$-unsaturated carboxylate salts and alkaline earth metal $\alpha,\beta$-unsaturated carboxylate salts, or any combination thereof. Quaternary ammonium salts with thermal stability include, but are not limited to, tetramethylammonium acrylate, tetraethylammonium acrylate, tetrapropylammonium acrylate, tetrabutylammonium acrylate, tetramethylammonium methacrylate, tetraethylammonium methacrylate, tetrapropylammonium methacrylate, tetrabutylammonium methacrylate, mono-tetramethylammonium fumarate, bis-tetramethylammonium fumarate, potassium tetramethylammonium fumarate, mono-tetraethylammonium fumarate, bis-tetraethylammonium fumarate, potassium tetraethylammonium fumarate, mono-tetrapropylammonium fumarate, bis-tetrapropylammonium fumarate, potassium tetrapropylammonium fumarate, mono-tetrabutylammonium fumarate, bis-tetrabutylammonium fumarate, potassium tetrabutylammonium fumarate, mono-potassium maleate, bis-potassium maleate, mono-tetramethylammonium maleate, bis-tetramethylammonium maleate, potassium tetramethylammonium maleate, mono-tetraethylammonium maleate, bis-tetraethylammonium maleate, potassium tetraethylammonium maleate, mono-tetrapropylammonium maleate, bis-tetrapropylammonium maleate, potassium tetrapropylammonium maleate, mono-tetrabutylammonium maleate, bis-tetrabutylammonium maleate, potassium tetrabutylammonium maleate, and the like.

In one aspect of the present invention, the catalyst composition comprising at least one $\alpha,\beta$-unsaturated carboxylate salt has thermal stability up to about 150° C., wherein no or substantially no volatile amine compounds are emitted. Typical foam temperatures resulting from the exothermic reactions during the processing of PIR/PUR foam can be in the range of about 80° C. to about 150° C. In a further aspect, the catalyst system of the present invention has thermal stability up to about 175° C., about 200° C., about 220° C., about 240° C., or about 250° C.

The carboxylate salts of the catalyst composition of the present invention can be produced, for example, by the reaction of an organic acid with an alkali hydroxide. In another aspect of the present invention, the carboxylate salt can be produced by the reaction of an organic acid with a tetraalkylammonium hydroxide, or a reaction of an organic acid with a tertiary amine followed by a reaction with an epoxy compound. The latter reaction with an epoxy can lead to a hydroxyalkyl quaternary compound which is unstable at elevated temperatures.

Although not a requirement of the present invention, the catalyst composition can further comprise other catalytic materials or carboxylate salts in any amount. These include, but are not limited to, alkali metal carboxylate salts, alkaline earth metal carboxylate salts, quaternary ammonium carboxylate salts, or combinations thereof. As one example, the optional alkali metal carboxylate salt catalyst is potassium 2-ethylhexanoate, also known as potassium octoate, and this component can be present in solution form, such as is commercially available as the DABCO® K15 catalyst. It is also within the scope of the catalyst composition of this invention to include mixtures or combinations of more that one $\alpha,\beta$-unsaturated carboxylate salt. Additionally, the catalyst composition of the present invention can also further comprise at least one urethane catalyst.

The term "contact product" is used herein to describe compositions wherein the components are contacted together in any order, in any manner, and for any length of time. For example, the components can be contacted by blending or mixing. Further, contacting of any component can occur in the presence or absence of any other component of the foam formulations described herein. Combining additional catalyst components can be done by any method known to one of skill in the art. For example, in one aspect of the present invention, catalyst compositions can be prepared by combining or contacting the at least one $\alpha,\beta$-unsaturated carboxylate salt and with an optional alkali metal carboxylate salt. This typically occurs in solution form. In another aspect, the catalyst composition can be prepared by first mixing the respective carboxylic acids, followed by neutralization to form the corresponding salts.

While compositions and methods are described in terms of "comprising" various components or steps, the compositions and methods can also "consist essentially of" or "consist of" the various components or steps.

$\alpha,\beta$-Unsaturated Carboxylate Salts

Catalyst compositions of the present invention comprise at least one $\alpha,\beta$-unsaturated carboxylate salt. The at least one $\alpha,\beta$-unsaturated carboxylate salt is particularly useful for producing PIR/PUR foams. Further, catalyst compositions within the scope of the present invention can comprise at least one $\alpha,\beta$-unsaturated carboxylate salt having the formula

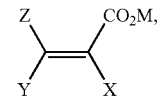

wherein:
  X, Y, and Z are selected independently from a $C_1$-$C_{36}$ alkyl, alkenyl, aryl, or aralkyl, any of which are substituted or unsubstituted; —$CO_2H$; —$CO_2M$; or a hydrogen atom; and
  M in each occurrence is selected independently from
  (i) an alkali metal ion,
  (ii) an alkaline earth metal ion, or
  (iii) a quaternary ammonium ion.

Unless otherwise specified, alkyl and alkenyl groups described herein are intended to include all structural isomers, linear or branched, of a given structure; for example, all enantiomers and all diasteriomers are included within this definition. As an example, unless otherwise specified, the term propyl is meant to include n-propyl and iso-propyl, while the term butyl is meant to include n-butyl, iso-butyl, t-butyl, sec-butyl, and so forth. Similarly, substituted alkyl, alkenyl, aryl, and aralkyl groups described herein are intended to include substituted analogs of a given structure. For example, the substituents on alkyl, alkenyl, aryl, and aralkyl groups can include, but are not limited to, halides; hydroxyl groups; amino groups; alkoxy, alkylamino, or dialkylamino groups having up to 10 carbon atoms; or combinations thereof.

Non-limiting examples of alkyl groups which can be present in the at least one α,β-unsaturated carboxylate salt include methyl, ethyl, propyl, butyl, pentyl, hexyl, heptyl, octyl, nonyl, or decyl, and the like. Examples of alkenyl groups within the scope of the present invention include, but are not limited to, ethenyl, propenyl, butenyl, pentenyl, hexenyl, heptenyl, octenyl, nonenyl, decenyl, and the like. Aryl and aralkyl (aralkyl is defined as an aryl-substituted alkyl or arylalkyl) groups include phenyl, alkyl-substituted phenyl, naphthyl, alkyl-substituted naphthyl, and the like. For example, non-limiting examples of aryl and aralkyl groups useful in the present invention include, but are not limited to, phenyl, tolyl, benzyl, dimethylphenyl, trimethylphenyl, phenylethyl, phenylpropyl, phenylbutyl, propyl-2-phenylethyl, and the like.

In one aspect of the present invention, X, Y, and Z are selected independently from a hydrogen atom, methyl, ethyl, propyl, butyl, pentyl, hexyl, phenyl, tolyl, benzyl, —$CO_2H$, or —$CO_2M$. In another aspect, M in each occurrence is an ion of lithium, potassium, sodium, rubidium, magnesium, or calcium, or a quaternary ammonium ion. Quaternary ammonium ions useful in the present invention include, but are not limited to, tetramethylammonium, tetraethylammonium, tetrapropylammonium, tetrabutylammonium, trimethyl(2-hydroxypropyl)ammonium, triethyl(2-hydroxypropyl)ammonium, tripropyl(2-hydroxypropyl)ammonium, tributyl(2-hydroxypropyl)ammonium, trimethyl(2-hydroxyethyl)ammonium, triethyl(2-hydroxyethyl)ammonium, tripropyl(2-hydroxyethyl)ammonium, tributyl(2-hydroxyethyl)ammonium, dimethylbenzyl(2-hydroxypropyl)ammonium, dimethylbenzyl(2-hydroxyethyl)ammonium, and the like, or any combination thereof. In a further aspect of the present invention, M is a potassium ion.

Salts and mixtures of salts of acrylic acid, methacrylic acid, fumaric acid, maleic acid, and the like, are within the scope of the present invention. Suitable α,β-unsaturated carboxylate salts useful in the present invention include, but are not limited to, potassium acrylate, tetramethylammonium acrylate, tetraethylammonium acrylate, tetrapropylammonium acrylate, tetrabutylammonium acrylate, potassium methacrylate, tetramethylammonium methacrylate, tetraethylammonium methacrylate, tetrapropylammonium methacrylate, tetrabutylammonium methacrylate, mono-potassium fumarate, bis-potassium fumarate, mono-tetramethylammonium fumarate, bis-tetramethylammonium fumarate, potassium tetramethylammonium fumarate, mono-tetraethylammonium fumarate, bis-tetraethylammonium fumarate, potassium tetraethylammonium fumarate, mono-tetrapropylammonium fumarate, bis-tetrapropylammonium fumarate, potassium tetrapropylammonium fumarate, mono-tetrabutylammonium fumarate, bis-tetrabutylammonium fumarate, potassium tetrabutylammonium fumarate, mono-potassium maleate, bis-potassium maleate, mono-tetramethylammonium maleate, bis-tetramethylammonium maleate, potassium tetramethylammonium maleate, mono-tetraethylammonium maleate, bis-tetraethylammonium maleate, potassium tetraethylammonium maleate, mono-tetrapropylammonium maleate, bis-tetrapropylammonium maleate, potassium tetrapropylammonium maleate, mono-tetrabutylammonium maleate, bis-tetrabutylammonium maleate, potassium tetrabutylammonium maleate, trimethyl(2-hydroxyethyl)ammonium acrylate, triethyl(2-hydroxyethyl)ammonium acrylate, tripropyl(2-hydroxyethyl)ammonium acrylate, tributyl(2-hydroxyethyl) ammonium acrylate, dimethylbenzyl(2-hydroxypropyl) ammonium acrylate, dimethylbenzyl(2-hydroxyethyl) ammonium acrylate, trimethyl(2-hydroxyethyl)ammonium methacrylate, triethyl(2-hydroxyethyl)ammonium methacrylate, tripropyl(2-hydroxyethyl)ammonium methacrylate, tributyl(2-hydroxyethyl)ammonium methacrylate, dimethylbenzyl(2-hydroxypropyl)ammonium methacrylate, dimethylbenzyl(2-hydroxyethyl)ammonium methacrylate, bis-(trimethyl(2-hydroxyethyl)ammonium)maleate, bis-(triethyl(2-hydroxyethyl)ammonium)maleate, bis-(tripropyl(2-hydroxyethyl)ammonium)maleate, bis-(tributyl(2-hydroxyethyl)ammonium)maleate, bis-(dimethylbenzyl(2-hydroxypropyl)ammonium)maleate, bis-(dimethylbenzyl(2-hydroxyethyl)ammonium)maleate, bis-(trimethyl(2-hydroxyethyl)ammonium)fumarate, bis-(triethyl(2-hydroxyethyl)ammonium)fumarate, bis-(tripropyl(2-hydroxyethyl)ammonium)fumarate, bis-(tributyl(2-hydroxyethyl)ammonium)fumarate, bis-(dimethylbenzyl(2-hydroxypropyl)ammonium)fumarate, bis-(dimethylbenzyl (2-hydroxyethyl)ammonium)fumarate, and the like, or any combination thereof. In another aspect of the present invention, the at least one α,β-unsaturated carboxylate salt is potassium acrylate, tetramethylammonium acrylate, tetramethylammonium maleate, or any combination thereof.

Polyisocyanates

Polyisocyanates that are useful in the PIR/PUR foam formation process include, but are not limited to, hexamethylene diisocyanate, isophorone diisocyanate, phenylene diisocyanate, toluene diisocyanate (TDI), diphenyl methane diisocyanate isomers (MDI), hydrated MDI and 1,5-naphthalene diisocyanate. For example, 2,4-TDI, 2,6-TDI, and mixtures thereof, can be readily employed in the present invention. Other suitable mixtures of diisocyanates include, but are not limited to, those known in the art as crude MDI, or PAPI, which contain 4,4'-diphenylmethane diisocyanate along with other isomeric and analogous higher polyisocyanates. In another aspect of this invention, prepolymers of polyisocyanates comprising a partially pre-reacted mixture of polyisocyanates and polyether or polyester polyol are suitable. In still another aspect, the polyisocyanate comprises MDI, or consists essentially of MDI or mixtures of MDI's.

The catalyst system and the method of producing PIR/PUR foam of the present invention can be used to produce many types of foam. This catalyst system is useful, for example, in the formation of foam products for rigid and flame retardant applications, which usually require a high Isocyanate Index. As defined previously, Isocyanate Index is the actual amount of polyisocyanate used divided by the theoretically required stoichiometric amount of polyisocyanate required to react with all the active hydrogen in the reaction mixture, multiplied by 100. For purposes of the present invention, Isocyanate Index is represented by the equation: Isocyanate Index= (Eq NCO/Eq of active hydrogen)×100, wherein Eq NCO is the number of NCO functional groups in the polyisocyanate, and Eq of active hydrogen is the number of equivalent active hydrogen atoms.

Foam products which are produced with an Isocyanate Index from about 80 to about 500 are within the scope of this invention. In accordance with other aspects of the present invention, the Isocyanate Index is from about 100 to about 475, from about 125 to about 450, from about 150 to about 425, or from about 200 to about 400.

Polyols

Active hydrogen-containing compounds for use with the foregoing polyisocyanates in forming the polyisocyanurate/polyurethane foams of this invention can be any of those organic compounds having at least two hydroxyl groups such as, for example, polyols. Polyols that are typically used in PIR/PUR foam formation processes include polyalkylene ether and polyester polyols. The polyalkylene ether polyol includes the poly(alkyleneoxide) polymers such as poly(ethyleneoxide) and poly(propyleneoxide) polymers and copolymers with terminal hydroxyl groups derived from polyhydric compounds, including diols and triols, These include, but are not limited to, ethylene glycol, propylene glycol, 1,3-butane diol, 1,4-butane diol, 1,6-hexane diol, neopentyl glycol, diethylene glycol, dipropylene glycol, pentaerythritol, glycerol, diglycerol, trimethylol propane, cyclohexane diol, and sugars such as sucrose and like low molecular weight polyols.

Amine polyether polyols can be used in the present invention. These can be prepared when an amine such as, for example, ethylenediamine, diethylenetriamine, tolylenediamine, diphenylmethanediamine, or triethanolamine is reacted with ethylene oxide or propylene oxide.

In another aspect of the present invention, a single high molecular weight polyether polyol, or a mixture of high molecular weight polyether polyols, such as mixtures of different multifunctional materials and/or different molecular weight or different chemical composition materials can be used.

In yet another aspect of the present invention, polyester polyols can be used, including those produced when a dicarboxylic acid is reacted with an excess of a diol. Non-limiting examples include adipic acid or phathalic acid or phthalic anhydride reacting with ethylene glycol or butanediol. Polyols useful in the present invention can be produced by reacting a lactone with an excess of a diol, for example, caprolactone reacted with propylene glycol. In a further aspect, active hydrogen-containing compounds such as polyester polyols and polyether polyols, and combinations thereof, are useful in the present invention.

Blowing Agents

Blowing agents that can be used alone or in combination in the PIR/PUR foam formation process include, but are not limited to, water, methylene chloride, acetone, chlorofluorocarbons (CFCs), hydrofluorocarbons (HFCs), hydrochlorofluorocarbons (HCFCs), and hydrocarbons. Non-limiting examples of HFCs include HFC-245fa, HFC-134a, and HFC-365. Illustrative examples of HCFCs include HCFC-141b, HCFC-22, and HCFC-123. Exemplary hydrocarbons include n-pentane, isopentane, cyclopentane, and the like, or any combination thereof.

The amount of blowing agent used can vary based on, for example, the intended use and application of the foam product and the desired foam stiffness and density. In the foam formulation and method for preparing a polyisocyanurate/polyurethane foam of the present invention, the blowing agent is present in amounts from about 10 to about 80 parts by weight per hundred weight parts polyol (pphp), from about 12 to about 60 pphp, from about 14 to about 40 pphp, or from about 16 to about 25 pphp. If water is present in the formulation, for use as a blowing agent or otherwise, water is present in amounts up to about 15 pphp. In other words, water can range from 0 to about 15 pphp. In another aspect, water can range from 0 to about 10 pphp, from 0 to about 8 pphp, from 0 to about 6 pphp, or from 0 to about 4 pphp.

Urethane Catalyst

Urethane catalysts accelerate the reaction to form polyurethanes, and can be used as a further component of the catalyst system of the present invention to produce polyisocyanurate/polyurethane foam. Urethane catalysts suitable for use herein include, but are not limited to, metal salt catalysts, such as organotins, and amine compounds, such as triethylenediamine (TEDA), N-methylimidazole, 1,2-dimethylimidazole, N-methylmorpholine (commercially available as the DABCO® NMM catalyst), N-ethylmorpholine (commercially available as the DABCO® NEM catalyst), triethylamine (commercially available as the DABCO® TETN catalyst), N,N'-dimethylpiperazine, 1,3,5-tris(dimethylaminopropyl)hexahydrotriazine (commercially available as the Polycat® 41 catalyst), 2,4,6-tris(dimethylaminomethyl)phenol (commercially available as the DABCO TMR® 30 catalyst), N-methyldicyclohexylamine (commercially available as the Polycat® 12 catalyst), pentamethyldipropylene triamine (commercially available as the Polycat® 77 catalyst), N-methyl-N'-(2-dimethylamino)-ethyl-piperazine, tributylamine, pentamethyldiethylenetriamine (commercially available as the Polycat® 5 catalyst), hexamethyltriethylenetetramine, heptamethyltetraethylenepentamine, dimethylaminocyclohexylamine (commercially available as the Polycat® 8 catalyst), pentamethyldipropylene-triamine, triethanolamine, dimethylethanolamine, bis(dimethylaminoethyl)ether (commercially available as the DABCO® BL19 catalyst), tris(3-dimethylamino)propylamine (commercially available as the Polycat® 9 catalyst), 1,8-diazabicyclo[5.4.0]undecene (commercially available as the DABCO® DBU catalyst) or its acid blocked derivatives, and the like, as well as any mixture thereof. Particularly useful as a urethane catalyst for foam applications related to the present invention is the Polycat® 5 catalyst, which is known chemically as pentamethyldiethylenetriamine.

For preparing a polyisocyanurate/polyurethane foam of the present invention, the urethane catalyst can be present in the formulation from 0 to about 10 pphp, from 0 to about 8 pphp, from 0 to about 6 pphp, from 0 to about 4 pphp, from 0 to about 2 pphp, or from 0 to about 1 pphp. In another aspect, the urethane catalyst is present from 0 to about 0.8 pphp, from 0 to about 0.6 pphp, from 0 to about 0.4 pphp, or from 0 to about 0.2 pphp.

Miscellaneous Additives

Depending upon on the requirements during foam manufacturing or for the end-use application of the foam product, various additives can be employed in the PIR/PUR foam formulation to tailor specific properties. These include, but are not limited to, cell stabilizers, flame retardants, chain extenders, epoxy resins, acrylic resins, fillers, pigments, or any combination thereof. It is understood that other mixtures or materials that are known in the art can be included in the foam formulations and are within the scope of the present invention.

Cell stabilizers include surfactants such as organopolysiloxanes. Silicon surfactants can be present in the foam formulation in amounts from about 0.5 to about 10 pphp, about 0.6 to about 9 pphp, about 0.7 to about 8 pphp, about 0.8 to about 7 pphp, about 0.9 to about 6 pphp, about 1 to about 5 pphp, or about 1.1 to about 4 pphp. Useful flame retardants include halogenated organophosphorous compounds and non-halogenated compounds. A non-limiting example of a halogenated flame retardant is trichloropropylphosphate (TCPP). For example, triethylphosphate ester (TEP) and DMMP are non-halogenated flame retardants. Depending on the end-use foam application, flame retardants can be present in the foam formulation in amounts from 0 to about 50 pphp, from 0 to about 40 pphp, from 0 to about 30 pphp, or from 0 to about 20 pphp. In another aspect, the flame retardant is present from 0 to about 15 pphp, 0 to about 10 pphp, 0 to about 7 pphp, or 0 to about 5 pphp. Chain extenders such as ethylene glycol and butane diol can also be employed in the present invention. Ethylene glycol, for instance, can also be present in the formulation as a diluent or solvent for the carboxylate salt catalysts of the present invention.

Polyisocyanurate/Polyurethane Foam Formulation and Process

One aspect of the present invention provides for a composition comprising the contact product of at least one active hydrogen-containing compound and a catalyst composition comprising at least one α,β-unsaturated carboxylate salt. A second aspect provides a composition comprising the contact product of at least one polyisocyanate and a catalyst composition comprising at least one α,β-unsaturated carboxylate salt. In both of these two compositions, the composition can further comprise at least one urethane catalyst. Likewise, the compositions can further comprise at least one additive selected from at least one cell stabilizer, at least one flame retardant, at least one chain extender, at least one epoxy resin, at least one acrylic resin, at least one filler, at least one pigment, or any combination thereof.

The present invention provides a method for preparing a polyisocyanurate/polyurethane (PIR/PUR) foam which comprises contacting at least one polyisocyanate with at least one active hydrogen-containing compound, in the presence of at least one blowing agent and an effective amount of a catalyst composition comprising at least one α,β-unsaturated carboxylate salt. In accordance with the method of the present invention, PIR/PUR foams can be produced having a density from about 20 Kg/m$^3$ to about 250 Kg/m$^3$ (about 1.25 lb/ft$^3$ to about 15.5 lb/ft$^3$), or from about 24 Kg/m$^3$ to about 60 Kg/m$^3$ (about 1.5 lb/ft$^3$ to about 3.75 lb/ft$^3$).

In another aspect, the method of the present invention offers a substantially consistent foam height rise versus time—even at a high Isocyanate Index—that is highly desired for continuous foam manufacturing operations. The method for preparing PIR/PUR foams also provides equivalent or faster surface cure when compared to other commercially available catalyst systems, such that the PIR/PUR foam has enhanced surface adherence, useful for the production are articles such as laminated foam panels.

Optionally, in yet another aspect, the method of the present invention can produce PIR/PUR foams with no or substantially no undesirable amine odor. Dependent upon the selection of the specific at least one α,β-unsaturated carboxylate salt, this method can provide thermal stability at the temperatures which PIR/PUR foams normally encounter during manufacturing, even those foams formulated with a high Isocyanate Index. In a further aspect, the method for preparing PIR/PUR foam has thermally stability up to about 150° C., or about 175° C., or about 200° C., or about 220° C., or about 240° C., or about 250° C. In a still further aspect, the method of the present invention produces PIR/PUR foam that is substantially free of volatile amines and/or amine odors.

The catalyst composition comprising at least one α,β-unsaturated carboxylate salt should be present in the foam formulation in a catalytically effective amount. In PIR/PUR foam formulations of the present invention, the catalyst composition is present in amounts from about 0.05 to about 10 parts by weight per hundred weight parts of the at least one active hydrogen-containing compound, excluding the weight contribution of the catalyst system diluent. In another aspect, the catalyst composition is present in amounts from about 0.4 to about 9 parts, or from about 0.8 to about 8 parts, by weight per hundred weight parts of the at least one active hydrogen-containing compound. If the at least one active hydrogen-containing compound is an at least one polyol, the catalyst composition is present in amounts from about 0.05 to about 10 parts by weight per hundred weight parts polyol (pphp). In another aspect, the catalyst composition is present in amounts from about 0.2 to about 9.5 pphp, about 0.4 to about 9 pphp, about 0.6 to about 8.5 pphp, or about 0.8 to about 8 pphp.

In accordance with one aspect of the method of the present invention, the components of the foam formulation are contacted substantially contemporaneously. For example, at least one polyisocyanate, at least one active hydrogen-containing compound, at least one blowing agent and an effective amount of a catalyst composition comprising at least one α,β-unsaturated carboxylate salt, are contacted together. Given the number of components involved in PIR/PUR formulations, there are many different orders of combining the components, and one of skill in the art would realize that varying the order of addition of the components falls within the scope of the present invention. As well, for each of the different orders of combining the aforementioned components of the foam formulation, the foam formulation of the present invention can further comprise at least one urethane catalyst. In addition, the method of producing PIR/PUR foams can further comprise the presence of at least one additive selected from at least one cell stabilizer, at least one flame retardant, at least one chain extender, at least one epoxy resin, at least one acrylic resin, at least one filler, at least one pigment, or any combination thereof. In one aspect of the present invention, all of the components, including optional components, are contacted substantially contemporaneously.

In another aspect of the present invention, a premix of ingredients other than the at least one polyisocyanate are contacted first, followed by the addition of the at least one polyisocyanate. For example, the at least one active hydrogen-containing compound, the at least one blowing agent, and the catalyst composition of the present invention are contacted initially to form a premix. The premix is then contacted with the at least one polyisocyanate to produce PIR/PUR foams in accordance with the method of the present invention. In a further aspect of the present invention, the same method can be employed, wherein the premix further comprises at least one urethane catalyst. Likewise, the premix can further comprise at least one additive selected from at least one cell stabilizer, at least one flame retardant, at least one chain extender, at least one epoxy resin, at least one acrylic resin, at least one filler, at least one pigment, or any combination thereof.

One aspect of the present invention provides a method for preparing a polyisocyanurate/polyurethane foam comprising
(a) forming a premix comprising:
  i) at least one active hydrogen-containing polyol;
  ii) about 10 to about 80 parts by weight per hundred weight parts of the polyol (pphp) blowing agent;
  iii) about 0.5 to about 10 pphp silicon surfactant;
  iv) zero to about 10 pphp water;
  v) zero to about 50 pphp flame retardant;
  vi) zero to about 10 pphp urethane catalyst; and
  vii) about 0.05 to about 10 pphp of a catalyst composition comprising at least one α,β-unsaturated carboxylate salt; and
(b) contacting the premix with at least one polyisocyanate at an Isocyanate Index from about 80 to about 500.

EXAMPLES

The foams of the following examples were produced by adding the catalyst of the present invention into a premix of the polyol, flame retardant (TCPP), surfactant, urethane catalyst (Polycat® 5 catalyst), and blowing agent (n-pentane), in a 32-oz (951 ml) metal cup. This composition was mixed for about 10 seconds (s) at about 6,000 RPM using an overhead stirrer fitted with a 2-inch (5.1 cm) diameter stirring paddle. Sufficient isocyanate was then added to achieve the desired Isocyanate Index, and the formulation was mixed well for about 6 seconds (s) at about 6,000 RPM using the same stirrer. The 32-oz cup was dropped through a hole in the bottom of a 128-oz (3804 ml) paper cup on a stand. The hole was sized appropriately to catch the lip of the 32-oz cup. The total volume of the foam container was about 160 oz (4755 ml). Foams approximated this volume at the end of the foam forming reaction. Foam height over time was recorded. String gel time and tack free time were measured manually with a wooden stick and chronometer. Start time and rise time were determined with automated rate of rise equipment.

In the following examples, various types and quantities of catalysts were used to produce PIR/PUR foams of the present invention. Although the amounts of each catalyst are not the same in these examples, the respective catalyst quantities were chosen to provide similar string gel times. PIR/PUR foam properties are typically compared at equivalent string gel times. In these examples, unless otherwise specified, the pphp values listed for the carboxylate salt catalysts exclude the additional weight of the diluent. Table I lists the components of the foam formulation and their respective pphp that are used in the examples.

Table I. Formulations of Foams in Examples 1-3 (catalyst varied)

| COMPONENT | PARTS (weight) |
|---|---|
| Polyester Polyol | 100 |
| TCPP | 4.7 |
| Surfactant | 1.7 |
| Polycat ® 5 catalyst | 0.15 |
| n-Pentane | 17 |
| Trimer Catalyst | Varied |
| Isocyanate Index | Index 270 |

Inventive Example 1

Comparison of a Potassium Acrylate Catalyst with Standard Catalysts

α,β-unsaturated carboxylate salt catalyst 1 was prepared by dissolving about 57.5 grams of KOH in about 200 grams of ethylene glycol. The solution was then neutralized by the addition of about 64.8 grams of acrylic acid. The water from neutralization was then removed at about 80° C. under vacuum (about 8 mmHg). The resulting approximate 33% solution of potassium acrylate (about 1.6 pphp or 1.6 grams excluding diluent; about 14.4 mmol) in ethylene glycol constituted catalyst 1. Foams were made using the standard formulation in Table I at an Isocyanate Index of about 270.

Inventive catalyst 1 was compared with two commercial standards, the DABCO® K15 catalyst (70% potassium octoate solution) and the DABCO TMR® catalyst (75% 2-hydroxypropyltrimethylammonium octoate solution). Approximately 2.1 pphp of the DABCO® K15 catalyst were used; excluding diluent, this converts to about 1.5 pphp or 1.5 grams (about 8.1 mmol) of potassium octoate. Approximately 2.9 pphp of the DABCO TMR® catalyst were used; excluding diluent, this converts to about 2.2 pphp or 2.2 grams (about 8.3 mmol) of 2-hydroxypropyltrimethylammonium octoate.

At a fairly equivalent string gel time, Table II shows foam parameters such as start time, string gel time, height of string gel time (HSG), rise time and tack free time, for inventive catalyst 1 and the standard catalysts. Catalyst 1 provided a shorter tack free time than either the DABCO® K15 catalyst or the DABCO TMR® catalyst. Since tack free time is a measure of surface cure, catalyst 1 has a faster surface, cure than either commercial standard. Faster surface cure of the foam correlates with improved surface adhesion in foam laminations. The longer tack free time of the DABCO® K15 catalyst, an alkali metal carboxylate salt solution, suggests poorer surface curing and potential surface friability and surface adhesion issues in laminated foam operations.

FIG. 1 shows the foam height versus time curves for inventive catalyst 1, the DABCO® K15 catalyst, and the DABCO TMR® catalyst. Catalyst 1 has a uniform slope and minimal plateau that is comparable to, if not superior than, that of the DABCO TMR® catalyst (2-hydroxylpropyltrimethylammonium octoate). This consistent increase in foam height versus time is highly desired in continuous foam manufacturing operations.

Figure 2:
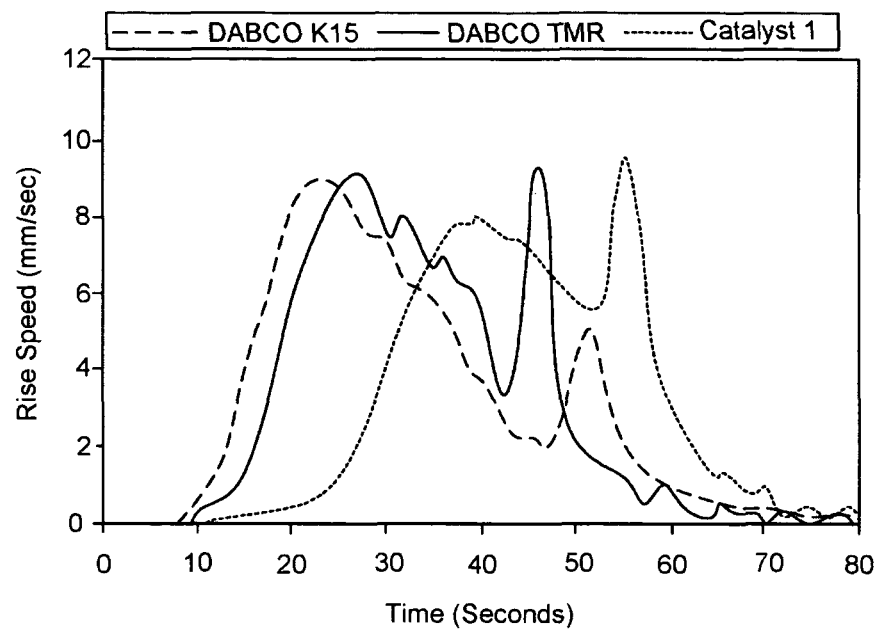
FIG. 2 presents a plot of the rate of foam rise speed versus time for α,β-unsaturated carboxylate salt catalyst 1, the DABCO® K15 catalyst, and the DABCO TMR® catalyst, at an Isocyanate Index of about 270.

The general shapes of the curves of inventive catalyst 1 and the DABCO TMR® catalyst are very similar in FIG. 2, further illustrating that inventive catalyst 1 would have excellent foam processing performance similar to that of the DABCO TMR® catalyst. These foam rise speed profiles indicate a more consistent foam rise over time and improved foam production performance in continuous operations. In contrast to the DABCO TMR® catalyst, however, inventive catalyst 1 does not have amine functionality and can produce PIR/PUR foams substantially free of volatile amines and/or amine odors. Noticeably, the DABCO® K15 catalyst has a long valley in between the two peaks in FIG. 2, indicating the different foam rise speeds associated with foam production using this alkali metal carboxylate salt catalyst.

Inventive Example 2

Comparison of a Tetramethylammonium Acrylate Catalyst with Standard Catalysts

α,β-unsaturated carboxylate salt catalyst 2 was prepared by dissolving acrylic acid in ethylene glycol, followed by neutralization with an approximate 25% solution of tetramethylammonium hydroxide in methanol. The methanol and the water from neutralization were then removed at about 80° C. under vacuum (about 8 mmHg). The resulting approximate 50% solution of tetramethylammonium acrylate (about 2.15 pphp or 2.15 grams, excluding diluent; about 14.8 mmol) in ethylene glycol constituted catalyst 2. Foams were made using the standard formulation in Table I at an Isocyanate Index of about 270.

Inventive catalyst 2 was compared with two commercial standard catalyst solutions, the DABCO® K15 catalyst (70% potassium octoate solution) and the DABCO TMR® catalyst (75% 2-hydroxypropyltrimethylammonium octoate solution). Approximately 2.1 pphp of the DABCO® K15 catalyst were used; excluding diluent, this converts to about 1.5 pphp or 1.5 grams (about 8.1 mmol) of potassium octoate. Approximately 2.9 pphp of the DABCO TMR® catalyst were used; excluding diluent, this converts to about 2.2 pphp or 2.2 grams (about 8.3 mmol) of 2-hydroxypropyltrimethylammonium octoate.

As shown in Table II, at a similar string gel time, inventive catalyst 2 had a tack free time of about 59 seconds, much shorter than that achieved with either the DABCO® K15 catalyst or the DABCO TMR® catalyst. As such, catalyst 2 would produce foam with a faster surface cure, less surface friability, and subsequently, better adhesion performance in laminated foam structures, as compared to either the DABCO® K15 catalyst or the DABCO TMR® catalyst.

Figure 3:
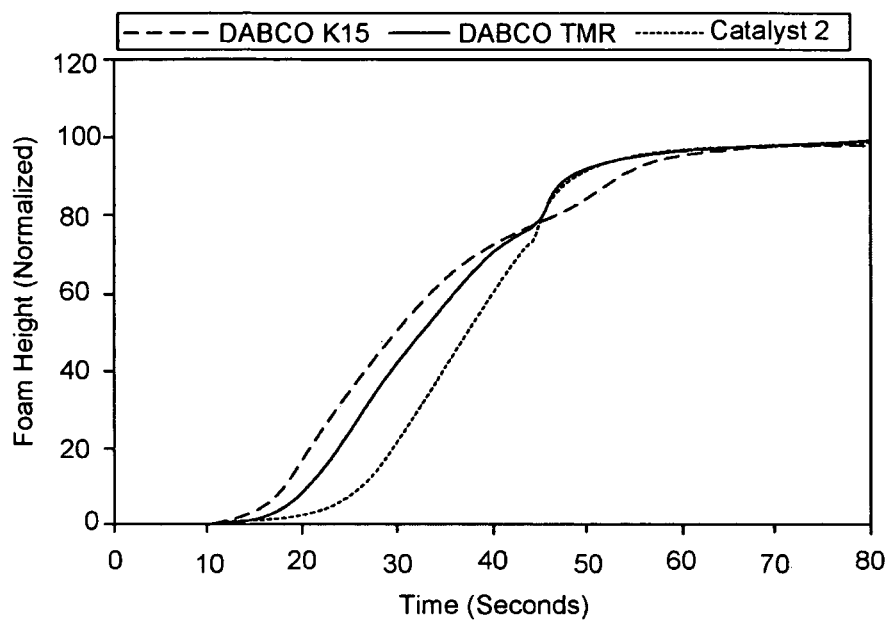
FIG. 3 presents a plot of the normalized foam height versus time for α,β-unsaturated carboxylate salt catalyst 2, the DABCO® K15 catalyst, and the DABCO TMR® catalyst, at an Isocyanate Index of about 270.

FIG. 3 compares the foam height versus time for inventive catalyst 2, the DABCO® K15 catalyst, and the DABCO TMR® catalyst. Catalyst 2 has the most uniform slope, even more uniform than that of the DABCO TMR® catalyst, indicating that catalyst 2 would have the most consistent foam rise or foam expansion speed during PIR/PUR foam manufacturing.

Inventive Example 3

Comparison of a Tetramethylammonium Maleate Catalyst with Standard Catalysts

α,β-unsaturated carboxylate salt catalyst 3 was prepared by dissolving maleic acid in ethylene glycol, followed by neutralization with an approximate 25% solution of tetramethylammonium hydroxide in methanol. The methanol and the water from neutralization were then removed at about 80° C. under vacuum (about 8 mmHg). The resulting approximate 50% solution of tetramethylammonium maleate (about 1.5 pphp or 1.5 grams, excluding diluent; about 8 mmol) in ethylene glycol constituted catalyst 3. Foams were made using the standard formulation in Table I at an Isocyanate Index of about 270.

Inventive catalyst 3 was compared with two commercial standard catalyst solutions, the DABCO® K15 catalyst (70% potassium octoate solution) and the DABCO TMR® catalyst (75% 2-hydroxypropyltrimethylammonium octoate solution). Approximately 2.1 pphp of the DABCO® K15 catalyst were used; excluding diluent, this converts to about 1.5 pphp or 1.5 grams (about 8.1 mmol) of potassium octoate. Approximately 2.9 pphp of the DABCO TMR® catalyst were used; excluding diluent, this converts to about 2.2 pphp or 2.2 grams (about 8.3 mmol) of 2-hydroxypropyltrimethylammonium octoate.

As shown in Table II, at a similar string gel time, inventive catalyst 3 provided a tack free time of about 62 seconds, much shorter than either the DABCO® K15 catalyst or the DABCO TMR® catalyst. Inventive catalyst 3 would thus produce a foam product with a faster surface cure and better surface adherence during the manufacture of finished products such as laminated foam panels.

FIG. 4 compares the foam height versus time for inventive catalyst 3, the DABCO® K15 catalyst, and the DABCO TMR® catalyst. Catalyst 3 has a slope that is more uniform than either that of the DABCO® K15 catalyst or the DABCO TMR® catalyst. Hence, foam produced with inventive catalyst 3 would have the most consistent foam rise or foam expansion speed over time. This is a useful feature for continuous foam operations, such as those involving lamination processes.

TABLE II

Comparison of inventive catalysts 1-3 to standard catalysts

| Catalyst | Start Time [s] | String Gel Time [s] | HSG [%] | Rise Time [s] | Tack Free Time [s] |
|---|---|---|---|---|---|
| <sup>a</sup>2.1 pphp DABCO ® K15 | 14 | 54 | 91 | 72 | 108 |
| <sup>b</sup>2.9 pphp DABCO TMR ® | 16 | 49 | 91 | 65 | 77 |
| <sup>c</sup>1.6 pphp Catalyst 1 | 25 | 55 | 77 | 75 | 72 |
| <sup>c</sup>2.15 pphp Catalyst 2 | 20 | 48 | 89 | 74 | 59 |
| <sup>c</sup>1.5 pphp Catalyst 3 | 16 | 45 | 87 | 75 | 62 |

Notes:
<sup>a</sup>2.1 pphp DABCO ® K15 catalyst including diluent converts to about 1.5 pphp of potassium octoate salt catalyst excluding diluent.
<sup>b</sup>2.9 pphp DABCO TMR ® catalyst including diluent converts to about 2.2 pphp of 2-hydroxypropyltrimethylammonium octoate catalyst excluding diluent.
<sup>c</sup>Catalyst 1-3 pphp values exclude the diluent.

The invention claimed is:

1. A method for preparing a polyisocyanurate/polyurethane foam which comprises contacting at least one polyisocyanate with at least one polyol, in the presence of at least one blowing agent and a catalytically effective amount of a catalyst composition comprising a solution of at least one diluent having dissolved therein at least one α,β-unsaturated carboxylate salt of the formula:

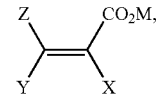

wherein X, Y, and Z are selected independently from methyl, —CO$_2$H; —CO$_2$M; or a hydrogen atom; and
wherein M in each occurrence is selected independently from
  (i) a potassium ion, or
  (ii) a quaternary ammonium ion, and wherein the at least one α,β-unsaturated carboxylate salt comprises a salt of at least one of acrylic acid, methacrylic acid, and fumaric acid.

2. The method of claim 1, further comprising the presence of at least one urethane catalyst.

3. The method of claim 1, wherein X, Y, and Z are selected independently from a hydrogen atom and methyl.

4. The method of claim 1, wherein M is a quaternary ammonium ion.

5. The method of claim 1, wherein M is a potassium ion.

6. The method of claim 4, wherein the quaternary ammonium ion comprises tetramethylammonium, tetraethylammonium, tetrapropylammonium, tetrabutylammonium, trimethyl(2-hydroxypropyl)ammonium, triethyl(2-hydroxypropyl) ammonium, tripropyl(2-hydroxypropyl) ammonium, tributyl(2-hydroxypropyl) ammonium, trimethyl(2-hydroxyethyl)ammonium, triethyl(2-hydroxyethyl) ammonium, tripropyl(2-hydroxyethyl)ammonium, tributyl(2-hydroxyethyl) ammonium, dimethylbenzyl(2-hydroxypropyl)ammonium, or dimethylbenzyl(2-hydroxyethyl) ammonium.

7. The method of claim 1, wherein the at least one α,β-unsaturated carboxylate salt comprises a salt of at least one of acrylic acid, and methacrylic acid.

8. The method of claim 1, wherein the at least one α,β-unsaturated carboxylate salt comprises at least one of potassium acrylate and tetramethylammonium acrylate.

9. The method of claim 8, wherein the at least one α,β-unsaturated carboxylate salt comprises tetramethylammonium acrylate.

10. The method of claim 1, wherein the at least one polyol comprises at least one polyether polyol, at least one polyester polyol, or any combination thereof.

11. The method of claim 1 wherein the foam has a density of 20 to 250 Kg/m$^3$.

12. The method of claim 8 wherein the salt comprises potassium acrylate.

13. The method of claim 1 wherein said contacting further comprises contacting at least one member selected from the group consisting of stabilizers, surfactants, flame retardants, chain extenders, epoxy resins, acrylic resins, fillers and pigments.

14. The method of claim 1 wherein the diluent comprises ethylene glycol.

15. The method of claim 1 wherein the isocyanate index is from about 200 to about 400.

16. The method of claim 1 wherein the catalyst, excluding the diluent, is present in an amount from about 0.05 to about 10 pphp and the foam has an isocyanate index of 80 to 500.

17. The method of claim 1 wherein the catalyst composition comprises a solution of potassium acrylate dissolved in ethylene glycol.

18. The method of claim 1 wherein the catalyst composition comprises a solution of tetramethylammonium acrylate dissolved in ethylene glycol.

19. The method of claim 1 wherein the carboxylate salt comprises at least one member selected from the group consisting of potassium acrylate, tetramethylammonium acrylate, tetraethylammonium acrylate, tetrapropylammonium acrylate, tetrabutylammonium acrylate, potassium methacrylate, tetramethylammonium methacrylate, tetraethylammonium methacrylate, tetrapropylammonium methacrylate, tetrabutylammonium methacrylate, mono-potassium fumarate, bis-potassium fumarate, mono-tetramethylammonium fumarate, bis-tetramethylammonium fumarate, potassium tetramethylammonium fumarate, mono-tetraethylammonium fumarate, bis-tetraethylammonium fumarate, potassium tetraethylammonium fumarate, mono-tetrapropylammonium fumarate, bis-tetrapropylammonium fumarate, potassium tetrapropylammonium fumarate, mono-tetrabutylammonium fumarate, bis-tetrabutylammonium fumarate, and potassium tetrabutylammonium fumarate.

20. The method of claim 1 wherein the polyisocyanate comprises at least one of toluene diisocyanate and diphenyl methane diisocyanate isomers.

21. The method of claim 2 wherein the urethane catalyst comprises at least one member selected from the group consisting of triethylenediamine, N-methylimidazole, 1,2-dimethylimidazole, N-methylmorpholine, N-ethylmorpholine, triethylamine, N,N'-dimethylpiperazine, 1,3,5-tris(dimethylaminopropyl)hexahydrotriazine, 2,4,6-tris(dimethylaminomethyl)phenol, N-methyldicyclohexylamine, pentamethyldipropylene triamine, N-methyl-N'-(2-dimethylamino)-ethyl-piperazine, tributylamine, pentamethyldiethylenetriamine, hexamethyltriethylenetetramine, heptamethyltetraethylenepentamine, dimethylaminocyclohexylamine, pentamethyldipropylene-triamine, triethanolamine, dimethylethanolamine, bis(dimethylaminoethyl)ether, tris(3-dimethylamino)propylamine, 1,8-diazabicyclo[5.4.0] undecene or its acid blocked derivatives, and any mixtures thereof.

22. The method of claim 21 wherein the urethane catalyst comprises pentamethyldiethylenetriamine.

23. A method for preparing a polyisocyanurate/polyurethane foam which comprises contacting at least one polyisocyanate with at least one polyol, in the presence of at least one blowing agent and a catalytically effective amount of a catalyst composition comprising the contact product of at least one diluent and at least one member selected from the group consisting of potassium acrylate, tetramethylammonium acrylate, tetraethylammonium acrylate, tetrapropylammonium acrylate, tetrabutylammonium acrylate, potassium methacrylate, tetramethylammonium methacrylate, tetraethylammonium methacrylate, tetrapropylammonium methacrylate, tetrabutylammonium methacrylate, mono-potassium fumarate, bis-potassium fumarate, mono-tetramethylammonium fumarate, bis-tetramethylammonium fumarate, potassium tetramethylammonium fumarate, mono-tetraethylammonium fumarate, bis-tetraethylammonium fumarate, potassium tetraethylammonium fumarate, mono-tetrapropylammonium fumarate, bis-tetrapropylammonium fumarate, potassium tetrapropylammonium fumarate, mono-tetrabutylammonium fumarate, bis-tetrabutylammonium fumarate, and potassium tetrabutylammonium fumarate.

24. The method of claim 23 wherein the catalyst composition further comprises at least one amine compound.

25. The method of claim 24 wherein the amine compound comprises 1,8-diazabicyclo[5.4.0]undecene or its acid blocked derivatives.

26. The method of claim 23 wherein said contacting further comprises contacting at least one surfactant.

* * * * *